United States Patent
Gunuganti et al.

(10) Patent No.: US 12,074,762 B2
(45) Date of Patent: Aug. 27, 2024

(54) TENANT MOVEMENT IN A MULTI-TENANT SYSTEM

(71) Applicant: Alkira, Inc., San Jose, CA (US)

(72) Inventors: Ramakanth Gunuganti, San Jose, CA (US); Yogendra Singh, San Jose, CA (US)

(73) Assignee: ALKIRA, INC., San Jose, CA (US)

( * ) Notice: Subject to any disclaimer, the term of this patent is extended or adjusted under 35 U.S.C. 154(b) by 0 days.

(21) Appl. No.: 17/998,804

(22) PCT Filed: Apr. 15, 2021

(86) PCT No.: PCT/US2021/027575
§ 371 (c)(1),
(2) Date: Nov. 14, 2022

(87) PCT Pub. No.: WO2021/211910
PCT Pub. Date: Oct. 21, 2021

(65) Prior Publication Data
US 2023/0246909 A1 Aug. 3, 2023

Related U.S. Application Data

(60) Provisional application No. 63/010,653, filed on Apr. 15, 2020.

(51) Int. Cl.
*G06F 15/177* (2006.01)
*H04L 41/082* (2022.01)
*H04L 41/0897* (2022.01)

(52) U.S. Cl.
CPC ........ *H04L 41/082* (2013.01); *H04L 41/0897* (2022.05)

(58) Field of Classification Search
None
See application file for complete search history.

(56) References Cited

U.S. PATENT DOCUMENTS

| | | | |
|---|---|---|---|
| 2012/0250682 A1* | 10/2012 | Vincent | H04L 45/74 370/392 |
| 2016/0105471 A1* | 4/2016 | Nunes | H04L 12/4641 709/228 |
| 2016/0119275 A1 | 4/2016 | Liebherr | |
| 2019/0171365 A1* | 6/2019 | Power | G06F 3/0649 |
| 2019/0272331 A1* | 9/2019 | Gangadhar | H04L 41/0897 |

OTHER PUBLICATIONS

International Search Report and Written Opinion for related International Application No. PCT/US2021/027575, mailed Jul. 26, 2021, (10 Pages).

* cited by examiner

*Primary Examiner* — Wing F Chan
*Assistant Examiner* — Andrew Woo
(74) *Attorney, Agent, or Firm* — Vani Moodley, Esq.

(57) ABSTRACT

Disclosed is a cloud services exchange platform that provides for multi-tenant orchestration with a flexible underlay facilitating tenant move with minimal disruption. Multi-tenant node engines are adapted to orchestrate the instantiation, hosting, and/or provisioning of services to one or more endpoints on behalf of a customer. Multiple dataplanes are associated with the cloud services exchange platform.

20 Claims, 5 Drawing Sheets

TENANT MOVEMENT IN A MULTI-TENANT SYSTEM

CROSS-REFERENCE TO RELATED APPLICATIONS

This application is a national phase application pursuant to 35 U.S.C. § of International Application No. PCT/US2021/027575, entitled "TENANT MOVEMENT IN A MULTI-TENANT SYSTEM", and filed on Apr. 15, 2021, which claims benefit of U.S. Provisional Application No. 63/010,653, entitled "TENANT MOVEMENT IN A MULTI-TENANT SYSTEM", and filed on Apr. 15, 2020, which is incorporated herein by reference in its entirety.

DETAILED DESCRIPTION

Figure 1:
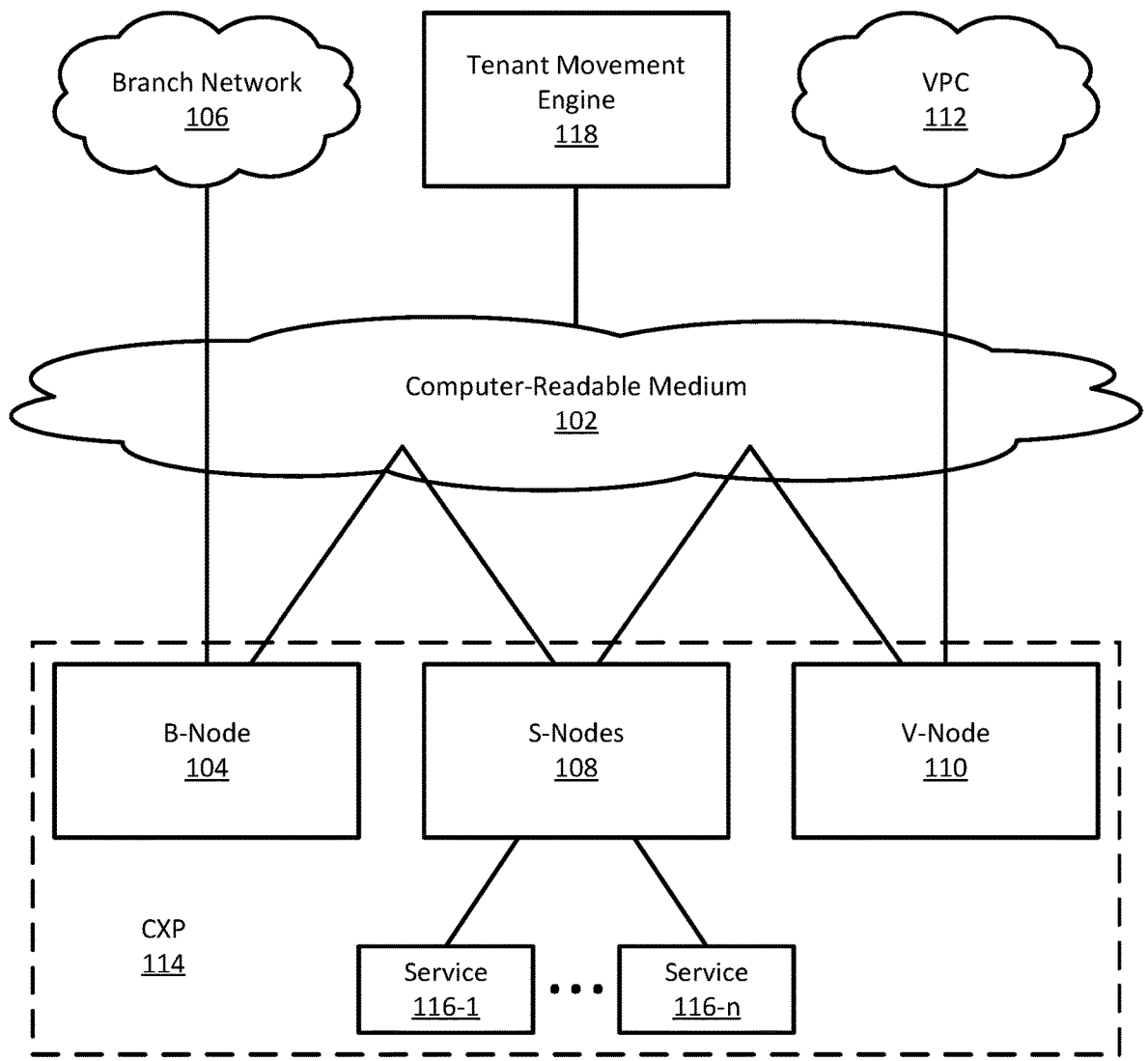
FIG. 1 is a diagram of an example of a system for multi-tenant orchestration with a flexible underlay facilitating tenant move with minimal disruption.

FIG. 1 is a diagram 100 of an example of a system for multi-tenant orchestration with a flexible underlay facilitating tenant move with minimal disruption. The diagram 100 includes a computer-readable medium (CRM) 102, a branch-facing node (B-node) 104 coupled to the CRM 102, a branch network 106 coupled to the B-node 104 through the CRM 102, service point attachment nodes (S-nodes) 108 coupled to the CRM 102, a virtual network facing node (V-Node) 110 coupled to the CRM 102, a virtual private cloud (VPC) 112 coupled to the V-Node 110 through the CRM 102, and a tenant movement engine 118 coupled to the CRM 102. In the diagram 100, a cloud services exchange platform (CXP) 114 includes the B-node 104, the S-nodes 108, the V-node 110, and a service engine 116-1 to a service engine 116-$n$ (collectively, the services 116) coupled to the S-nodes 108.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The B-Node 104 is intended to represent an engine that couples the branch network 106 to the CXP 114. In a specific implementation, the B-node is responsible for branch-to-cloud traffic. For example, the branch network 106 is intended to represent a campus, site, data center, or other branch network under the control of a customer. In a specific implementation, the B-node 104 creates an overlay to connect a network branch to the cloud. Data traffic originating from the branch network 106 within a given region may be controlled, managed, observed, and evaluated by the CXP 114. In a specific implementation, the customer, or a human or artificial agent thereof, managing the branch network 106, or a portion thereof, can access a single portal to select one or more of the services 116 in connection with a software as a service (SaaS), IaaS, or PaaS offering. In a specific implementation, the B-node 104 (potentially including other B-nodes, not shown) connects the CXP 114 to multiple different branch networks.

The S-nodes 108 are intended to represent multi-tenant node engines adapted to orchestrate the instantiation, hosting, and/or provisioning of the services 116 (selected via a portal accessible in association with the CXP 114) to one or more endpoints on behalf of a customer. S-nodes 108 may host services and apply policies that might otherwise only be available through other cloud platforms, in other regions or otherwise only available with certain connectivity. For instance, if a customer using Cloud Platform A desired certain security features provided by Firewall X service that was only available through Cloud Platform B, the S-nodes 108 may, via an orchestration component, host the Firewall X service for the customer so that the customer may obtain the service as though they were using Cloud Platform B. Even if a customer uses different cloud platforms or has different connectivity throughout different segments of its network, the dashboard of the CXP 114's portal may provide the foregoing features (e.g., monitoring traffic, managing connectivity, etc.) within the same dashboard interface. In a specific implementation, to effectuate these features, all data traffic is routed through the S-nodes 108.

The S-nodes 108 may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes 108 can instantiate such services automatically upon request, so that an individual user associated with or connected through the branch network 106 does not have to instantiate the services themselves. The S-nodes 108 may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The V-Node 110 is intended to represent an engine that couples the CXP 114 to the VPC 112. The VPC 112 is intended to represent a SaaS, IaaS, PaaS, or V-net. In a specific implementation, the V-node is responsible for cloud-to-cloud traffic. For example, the V-node 110 (potentially including other V-nodes, not shown) connects the CXP 114 to different clouds.

The CXP 114 is intended to represent a system that establishes connectivity, instantiates services for corresponding geolocations, aggregates data, implements policies, monitors traffic, and/or provide analytics across disparate cloud service providers and different connectivity architectures. In a specific implementation, CXP 114 operates in a manner that—to the customer—is connectivity agnostic and cloud provider agnostic. The CXP 114 may correspond to aggregated services offered for a given region or set of regions, where the regions may comprise one or more zones corresponding to subsections of such regions. The CXP 114 may service the branch network 106 within a particular region, and multiple CXPs may be stitched together as part of a larger cloud servicing network (e.g., mesh network, hub-and-spoke network, or a network having some other topology) to span multiple regions. In a specific implementation, the CXP 114 provides a portal through which a network administrator or other user associated with a customer may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

The tenant move engine 118 is intended to represent an engine moves a tenant with minimal disruption to existing tenant connectors. In a specific implementation, an underlying platform of a multi-tenant system has functionality enabling movement of tenants to new nodes. A dataplane node is shared across tenants for operational and cost efficiencies, then, as tenant resource requirements for a tenant increase the tenant move engine 118 moves the tenant to another set of nodes.

A connector attached to a CXP is represented as a set of overlay tunnels in a datapath. A dataplane is programmed with overlay tunnels connecting the dataplane to connectors using either private addresses or public addresses. If a tenant needs more connectors than the underlying nodes can provide then the tenant move engine 118 moves the tenant to another set of nodes. This move is handled by moving connector private and public addresses to the new nodes one path at a time. The new nodes are updated with the same overlay tunnels as before. The remote connector sees a disconnect and when reconnected it will resume on the new set of nodes.

Figure 2:
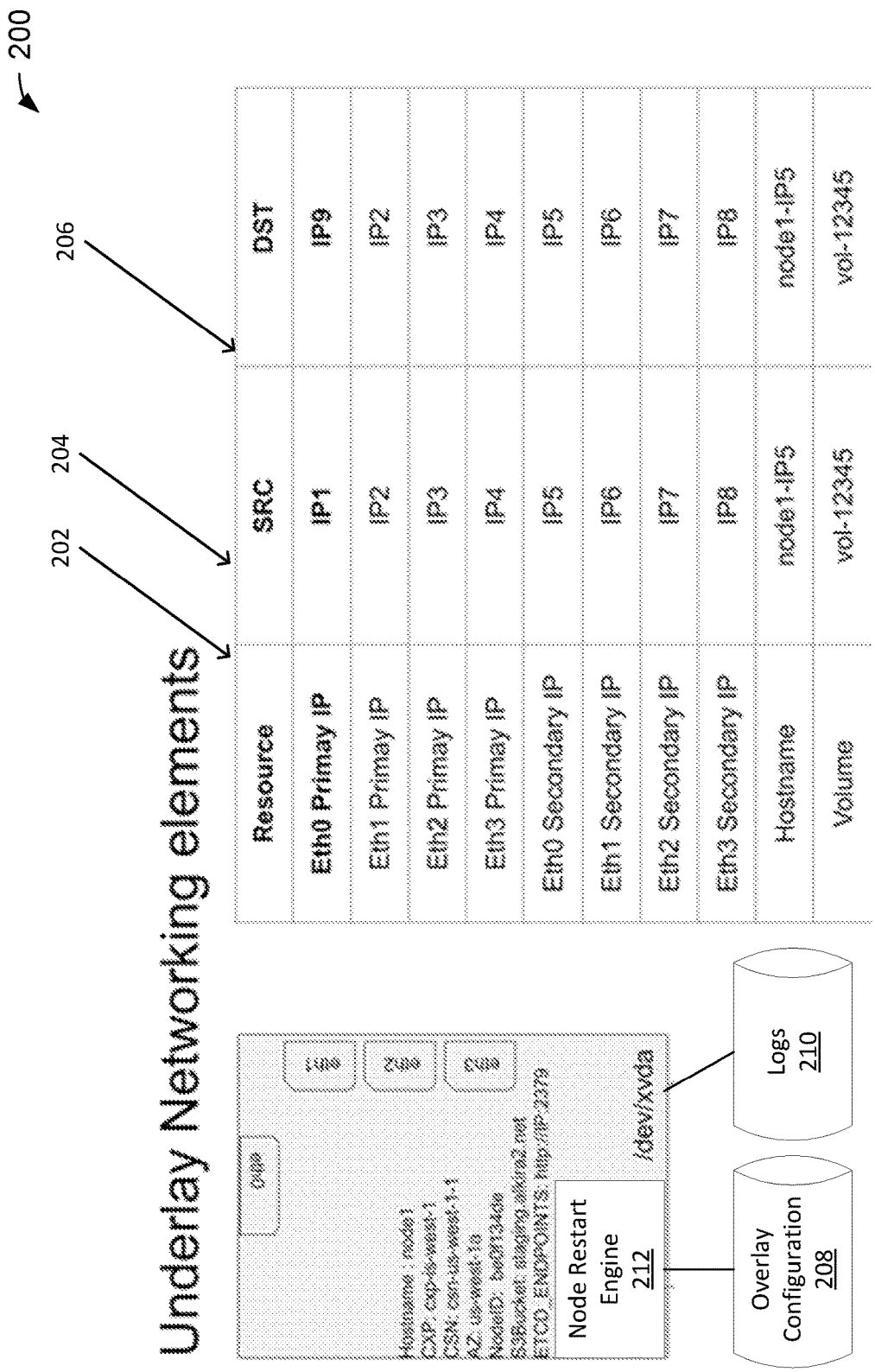
FIG. 2 illustrates a screenshot of network underlay elements.

FIG. 2 illustrates a screenshot 200 of network underlay elements. The screenshot 200 and listing of underlay and overlay elements in subsequent paragraphs is illustrative when considered in light of the discussion that follows. The screenshot 200 illustrates resources 202, sources 204, destinations 206, an overlay configuration datastore graphical object 208, a logs datastore graphical object 210, and a node restart engine graphical object 212. The resources 202 include hostname, volume, and Ethernet primary and secondary IP. The sources 204 and destinations 206 include text intended to represent applicable values. The overlay configuration datastore graphical object 208 and the logs datastore graphical object 210 are intended to illustrate overlay values and logs are known to a node restart engine represented by the node restart engine graphical object 212.

Underlay includes interfaces, subnets, private IPs, EIPs, security groups, static routes. In a specific implementation, underlay network elements include DNS/Host Name, Interfaces, EIPs, and routes. Interfaces include ENI (e.g., subnets, private IPs, security groups, and tags; note: ETH0 ENI cannot be moved so special handling is necessary for it but moveable IP is used for access and DNS). EIP to ENI mapping needs to be restitched with a tenant move. Routes include intra- and inter-AZ and Inter-CXP (regional).

Overlay includes tenant tunnels, interfaces, static routes of overlay, loopback IP for health check. BGP configuration for external facing nodes. In a specific implementation, overlay networking elements include tunnel interfaces, overlay static routes, BGP enabled on edges, and tunnels. Overlay configuration is stored in an external overlay configuration datastore (represented by the overlay configuration datastore graphical object 210) and when a node comes up, a process reads all overlay config for application on the node after all underlay is up. Tunnel interfaces include, e.g., 169.254.0.0/16 address. Overlay static routes include intra- and inter-AZ as well as inter-CXP (regional). Tunnels include intra-AZ, inter-AZ, and inter-CXP (regional).

Figure 3:
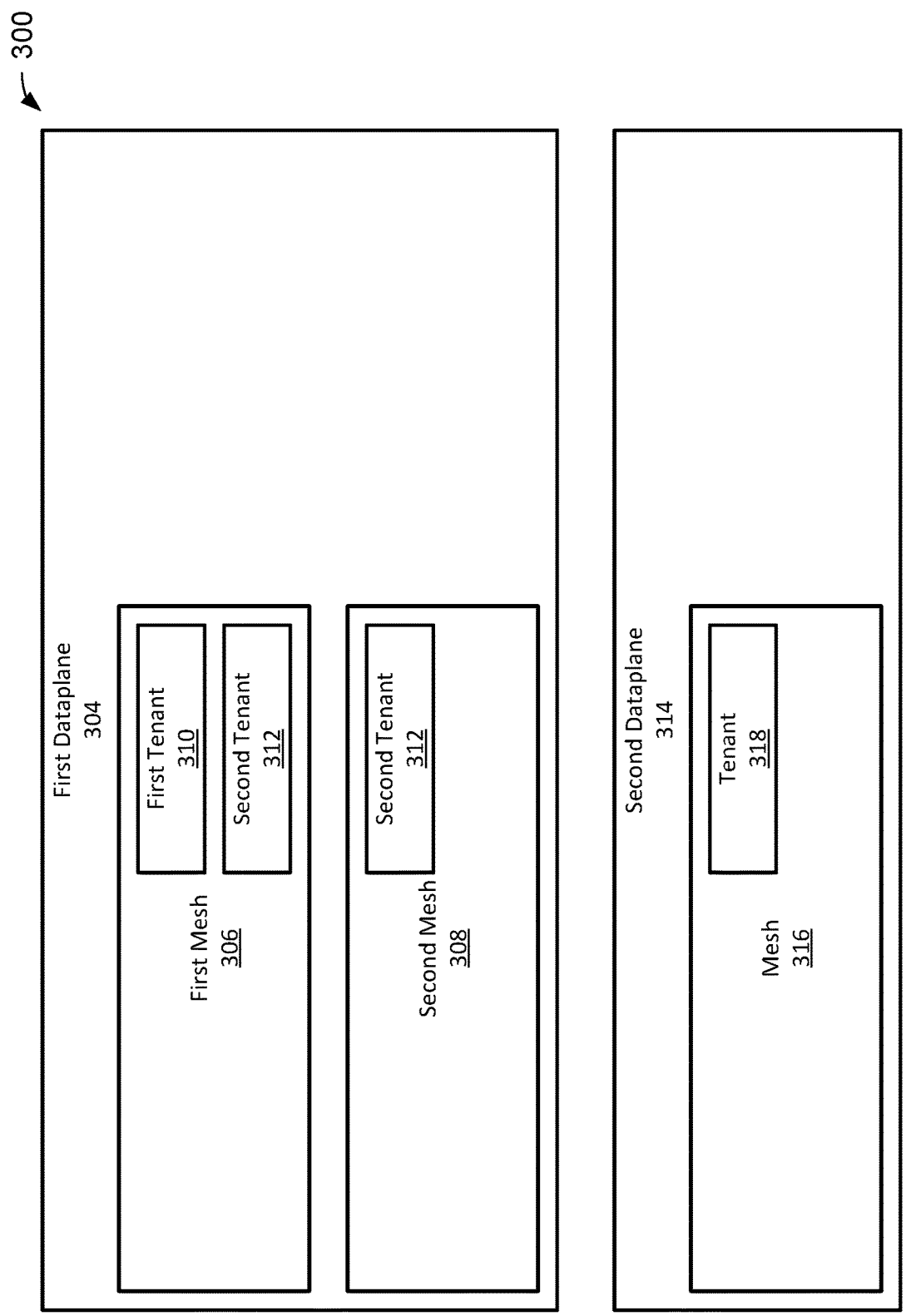
FIG. 3 is a diagram of dataplanes associated with a CXP.

FIG. 3 is a diagram 300 of dataplanes associated with a CXP. For illustrative purposes, the diagram 300 includes a first dataplane 304, a first mesh 306 and a second mesh 308 on the first dataplane 304, a first tenant 310 in the first mesh 304, a second tenant 312 in the first mesh 304 and the second mesh 306, a second dataplane 314, a first mesh 316 on the second dataplane 314, and a third tenant in the first mesh 316. A dataplane can be implemented as an ALKIRA CLOUD SERVICE NODE (CSN)™ dataplane.

The first dataplane 304 is intended to represent one of what is likely a limited number of dataplanes for a region. For example, in a specific implementation, there are 25 Gbps per dataplane and 5 dataplanes per region. Actual limitations are subject to resource availability and other constraints.

The first mesh 306 and the second mesh 308 are intended to represent two of what are likely a limited number of meshes for the dataplane 304. For example, in a specific implementation, there are a maximum of 4 Gbps and 200 connectors available to a mesh. In such an implementation, a mesh can be characterized as a collection of nodes that supports max of, e.g., 4 Gbps with, e.g., 200 connectors (GA). Again, actual limitations are subject to resource availability and other constraints.

The first tenant 310 and the second tenant 312 are intended to represent two of what are likely a limited number of tenants for the dataplane 304, the first mesh 306, and/or the second mesh 308. For example, in a specific implementation, there are a maximum of 4 tenants per mesh and a maximum of 8 tenants per dataplane. Tenants may also be slotted into skus (sku-500, sku-1000, sku-2000, sku-4000). As a default, tenants start with sku-500 and move to higher skus as the limits increase. Devops can override the skus at tenant onboarding. The first tenant 310 and the second tenant 312 are mapped to the first mesh 306 and the second mesh 308; connectors for the tenants are placed on the mesh; and nodes within the mesh can increase or decrease as tenants are placed but if a tenant outgrows a mesh, a new mesh will be created an the tenant will be moved to the new mesh.

The second dataplane 314, mesh 316, and tenant 318 are intended to illustrate the possibility of a dedicated dataplane and/or mesh in a system.

Figure 4:
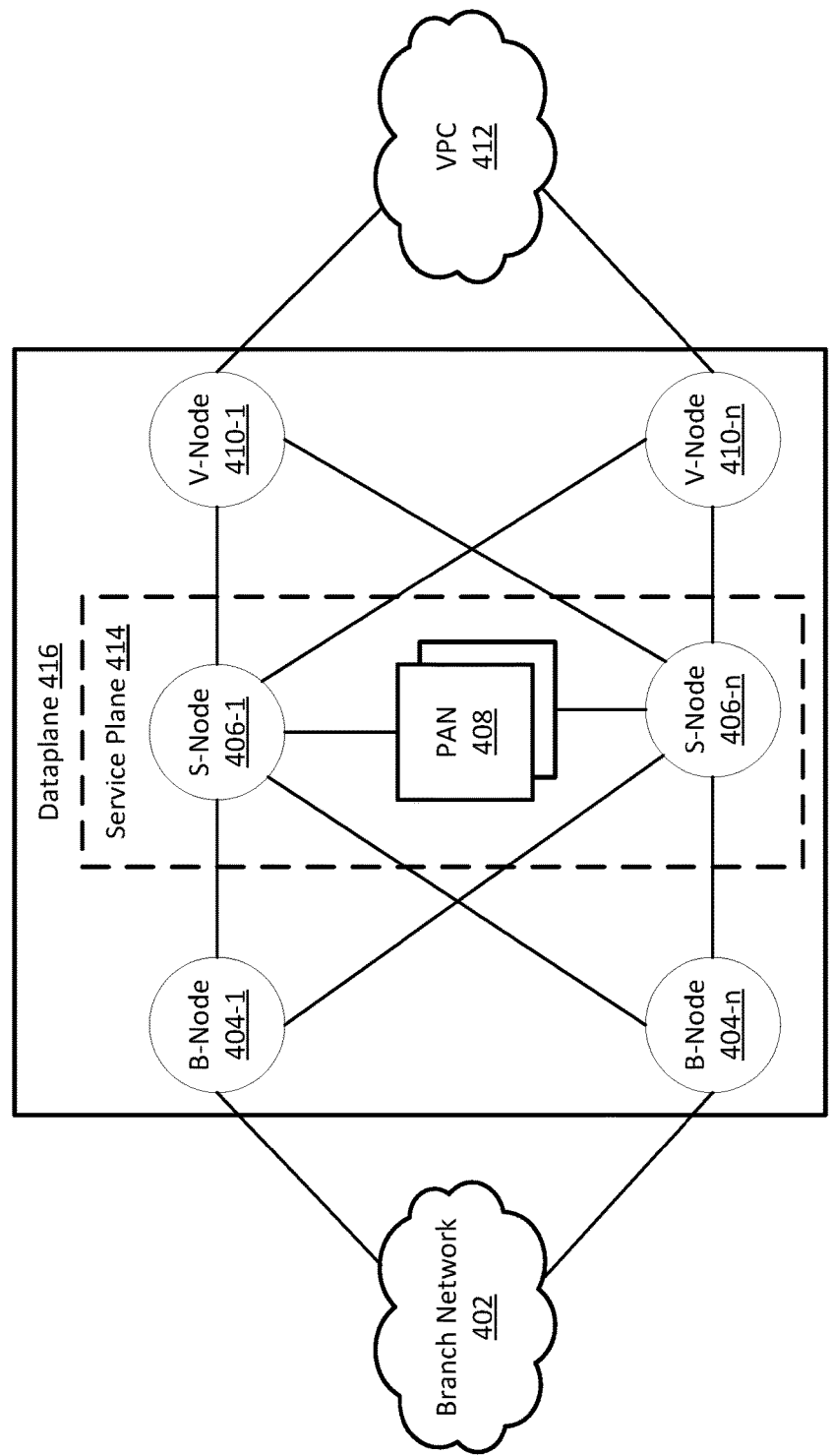
FIG. 4 is a diagram of dataplanes associated with a CXP.

FIG. 4 is a diagram 400 of dataplanes associated with a CXP. The diagram 400 includes a branch network 402, a B-node 404-1 to a B-node 404-n (collectively, the B-nodes 404) coupled to the branch network 402, an S-node 406-1 to an S-node 406-n (collectively, the S-nodes 406) coupled to the B-nodes 404, processing area networks (PANs) 408 coupled to the S-nodes 406, a V-node 410-1 to a V-node 410-n (collectively, the V-nodes 410) coupled to the S-nodes 406, and a VPC 412 coupled to the V-nodes 410. It may be noted that 'n' may or may not be indicative of the same number of each type of illustrated node.

Some elements omitted from the diagram 400 includes branch tunnels, gateway nodes (G-nodes), router filters, SaaS channels to the Internet, and cloud tunnels to the cloud. Branch tunnels can be implemented as, e.g., IPSEC tunnels into a regional dataplane. Each B-node can have a corresponding G-node or a group of B-nodes can have a corresponding G-node; G-nodes couple an orchestration service to a B-node. Router filters are coupled to B-nodes, S-nodes, and V-nodes on the control channel. Cloud tunnels couple the dataplane to one or more cloud platforms, such as AWS, GCP, and Azure.

The branch network 402 is similar to the branch network 104 of FIG. 1 and the VPC 412 is similar to the VPC 112 of FIG. 1. The S-nodes 406 and the PANs 408 can be referred to as a service plane 414. The B-nodes 404, service plane 414, and V-nodes 410 can be referred to as a dataplane 416. As illustrated in the diagram 400, the dataplane 416 operationally connects the branch network 402 to the VPC 412 with multiple sets of nodes. An example of a data plane 416 is an ALKIRA CLOUD SERVICE NODE (CSN)™ dataplane, which is a collection of nodes that moves customer traffic between connectors and through various service functions using a series of overlay tunnels.

The B-nodes 404 are intended to represent a collection of engines, including traffic handling engines from connectors to and from the branch network 402. The S-nodes 406 are intended to represent a collection of engines, including engines for executing stateful functions and service steering. The V-nodes 410 are intended to represent a collection of engines, including traffic handling engines from connectors to and from the VPC 412. Each type of node can be independently scaled for resiliency reasons and/or to achieve higher scale.

In an example of operation, a forward flow from a source in the branch network 402 (e.g., originating at a client behind an SDWAN) to a destination (e.g., a server) in the VPC 412, for illustrative purposes, traverses the B-node 404-1, the S-node 406-1, and the V-node 410-1. In addition, the forward flow can be characterized as passing from the S-node 406-1 to the PANs 408 and back to the S-node 406-1 before passing to the V-node 410-1.

In this example of operation, a stateful processing reverse flow traverses the V-node 410-1, the S-node 406-1, and the B-node 404-1 when passing from what was the destination (e.g., the server) to what was the source (e.g., the client). In addition, the stateful reverse flow can be characterized as passing from the S-node 406-1 to the PANs 408 and back to the S-node 406-1 before passing to the B-node 404-1. In a specific implementation, stateful reverse flow is achieved by configuring a VB node (e.g., the B-node 404-1 and the V-node 410-1) with an identical set of S-nodes (e.g., the S-nodes 406). Advantageously, if B-node 404-1 goes down, another of the B-nodes 404 can use the hash to maintain flow identity in a stateless way, though flow identity (state) is still maintained on the service plane 414. It may be desirable for the B-nodes 404 to maintain state for efficiency, but there are multiple ingress nodes and a hit node can compute the hash in exactly the same way, making the maintenance of state at the B-nodes 404 optional, assuming an implementation in which the B-nodes 404 are just used for steering traffic.

In a specific implementation, each connector has multiple paths into nodes but some bandwidth and/or connectors will be reserved on the mesh for each tenant. Rate limiters on the nodes can restrict the connectors/tenant to the desired bandwidth on a node. S-nodes and PANs can scale as tenant requirements increase and VB nodes can be added up to the desired mesh limits as tenants are added.

In an example of operation, assume a first tenant is added to a first mesh. The first tenant grows such that the first tenant needs a new (second) mesh. Accordingly, the first tenant is migrated to the second mesh. When the tenant is provisioned on the dataplane, creating tunnels, setting configurations, generating tasks, etc., a customer doesn't see the mesh (and probably doesn't care) but overlay tunnels should stay the same if the migration to the second mesh is intended to be seamless and multipath is assumed so migration should be one path at a time. In a specific implementation, operationalizing the second mesh takes 30 minutes or so with a best case of about 15 minutes but it takes longer with a relatively large number of connectors (e.g., with 100 connectors, it might take a couple of hours). In a specific implementation, the migration will be configured to always be completed in, ideally, minutes but, less ideally, in hours (not days).

Advantageously, the new node looks exactly like the old node. The underlay network is unchanged; secondary Ips can be moved from one node to another, though ENI cannot be moved. The underlay, can be characterized as a cloud-provided part (physical interfaces, IP addresses): cloud provider network infrastructure. The overlay can be characterized as a customer network on a datable.

Figure 5:
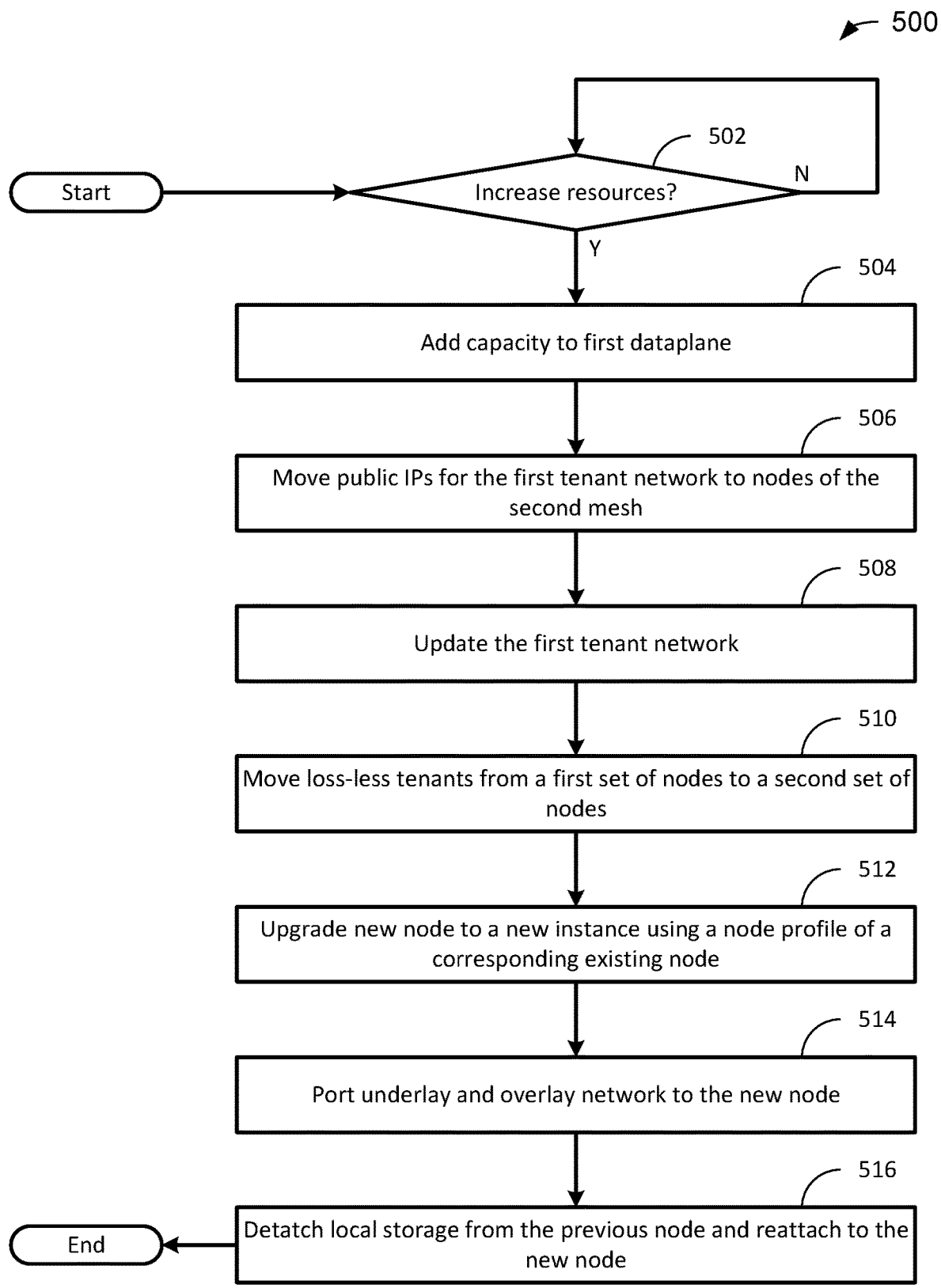
FIG. 5 depicts a flowchart of an example of tenant migration.

FIG. 5 depicts a flowchart 500 of an example of tenant migration. Assume a first tenant network with the following configuration (and a second tenant network with a similar configuration):
   IPSec connector1
   Mapped to CSN1:mesh1 in us-west-2
   OverlayTunnels:
     Tunnel1 (az-a)
      Alkira-public-ip: 20.1.1.1
     Tunnel2 (az-b)
      Alkira-public-ip: 30.1.1.1

Assume a first dataplane "CSN1 (us-west-2)" with the following configuration: Mesh 1 (6 nodes running different functions). The flowchart 500 starts at decision point 502 with determining whether a first tenant network needs increased resources. If it is determined the first tenant network does not need increased resources (502-N) then the flowchart 500 loops back to decision point 502.

If, on the other hand, it is determined the first tenant network needs increase resources (502-Y) then the flowchart 500 continues to module 504 where more capacity is added to the first dataplane. When a tenant network needs more resources (connectors or scale), more capacity (nodes) will be added to the first dataplane and the first tenant network will be moved there. Thus, the first dataplane gains the following configuration:
Mesh1 (6 nodes)
Mesh2 (6 nodes)→new The flowchart 500 continues to module 506 with moving public IPs for the first tenant network to nodes of the second mesh and to module 508 with updating the first tenant network. Because public IPs are the same as before, devices at the branch network will simply reconnect and recover. Assume the first tenant network gains the following configuration:
IPSec connector1
Mapped to CSN1:mesh2 in us-west-2
OverlayTunnels:
    Tunnel1 (az-a)
        Alkira-public-ip: 20.1.1.1
    Tunnel2 (az-b)
        Alkira-public-ip: 30.1.1.1

The flowchart 500 continues to module 510 with loss-less tenants move from a first set of nodes to a second set of nodes. If the dataplane has sufficient resources, the second set of nodes can be in the same dataplane as the first set of nodes. If the dataplane has insufficient resources (or if moving is desired for some other reason) the second set of nodes is in a second dataplane and loss-less tenants move from a first dataplane to a second dataplane.

The flowchart 500 continues to module 512 with a new node is upgraded to a new instance using a node profile of a corresponding existing node. In a specific implementation, when upgrading a node a new instance of a node with a new AMI image but using node profile (e.g., cloudinit) of a corresponding existing node, then port underlay and overlay network to the new node so the new node looks the same in a multi-AZ mesh to neighboring nodes. The flowchart 500 continues to module 514 with porting underlay and overlay network to the new node.

In addition to networking the local storage, which for AWS is an EBS volume, needs to be detached and reattached to the new node. The flowchart 500 continues to module 516 with detatching local storage from the previous node and reattaching to the new node. If any of the underlay attributes such as IPs or routes is changed or missed the overlay is likely to fail. In a specific implementation, for underlay IPs to portal across instances secondary IPs are migrated across instances within VPC. For non-management interfaces in AWS, ENI can be detached from the existing node to new node which would carry all the underlay attributes, but for management interface (eth0) ENI can't be detached and reattached. In this case it may be desirable to assign a secondary IP management interface and unassign it and assign it back to the management interface on the new node. This way any external nodes point to this management IP of this node continue to work across node migration.

What is claimed is:

1. A tenant migration method, comprising:
adding capacity to a first dataplane, wherein adding the capacity comprises adding a second set of nodes in a second mesh of the first dataplane;
moving public Internet Protocols (IPs) for a first tenant network to the second set of nodes of the second mesh;
updating the first tenant network;
moving loss-less tenants from a first set of nodes to the second set of nodes, wherein the first set of nodes is in a first mesh of the first dataplane;
upgrading a new node to a new instance using a node profile of a corresponding existing node of the first set of nodes; and
porting underlay and overlay network of the corresponding existing node to the new node.

2. The method of claim 1, further comprising determining whether the first tenant network needs increased resources.

3. The method of claim 1, wherein when the first tenant network needs connectors or scale: adding the second set of nodes to the first dataplane; and moving the first tenant network to the first dataplane.

4. The method of claim 1, wherein devices at a branch network reconnect and recover.

5. The method of claim 1, wherein when the first dataplane has sufficient resources, the second set of nodes are in the same dataplane as the first set of nodes.

6. The method of claim 1, wherein when the first dataplane has insufficient resources, adding the second set of nodes in a second dataplane; and moving the loss-less tenants from the first dataplane to the second dataplane.

7. The method of claim 1, further comprising networking local storage.

8. The method of claim 1, further comprising detaching and reattaching local storage to the new node.

9. The method of claim 1, further comprising migrating secondary Internet Protocols (IPs) across instances within a virtual private cloud (VPC).

10. The method of claim 1, further comprising assigning a secondary Internet Protocol (IP) management interface.

11. A tenant migration system, comprising:
a memory configured to store computer executable instructions; and
one or more hardware processors configured to execute the instructions to:
    add capacity to a first dataplane, wherein adding the capacity comprises adding a second set of nodes in a second mesh of the first dataplane;
    move public Internet Protocols (IPs) for a first tenant network to the second set of nodes of the second mesh;
    update the first tenant network;
    move loss-less tenants from the first set of nodes to the second set of nodes, wherein the first set of nodes is in a first mesh of the first dataplane;
    upgrade a new node to a new instance using a node profile of a corresponding existing node of the first set of nodes; and
    underlay and overlay network of the corresponding existing node to the new node.

12. The tenant migration system of claim 11, wherein the one or more hardware processors are further configured to execute the instructions to determine whether the first tenant network needs increased resources.

13. The tenant migration system of claim 11, wherein the one or more hardware processors are further configured to execute the instructions to:
add the second set of nodes to the first dataplane; and
move the first tenant network to the first dataplane.

14. The tenant migration system of claim 11, wherein devices at a branch network reconnect and recover.

15. The tenant migration system of claim 11, wherein when the first dataplane has sufficient resources, the second set of nodes are in the same dataplane as the first set of nodes.

16. The tenant migration system of claim 11, wherein when the first dataplane has insufficient resources, adding the second set of nodes in a second dataplane, and wherein the one or more hardware processors are further configured to move the loss-less tenants from the first dataplane to the second dataplane.

17. The tenant migration system of claim 11, wherein the one or more hardware processors are configured to execute the instructions to network local storage.

18. The tenant migration system of claim 11, wherein the one or more hardware processors are further configured to execute the instructions to detach and reattach local storage to the new node.

19. The tenant migration system of claim 11, wherein the one or more hardware processors are further configured to execute the instructions to migrate secondary Internet Protocols (IPs) across instances within a virtual private cloud (VPC).

20. The tenant migration system of claim 11, wherein the one or more hardware processors are further configured to execute the instructions to assign a secondary Internet Protocol (IP) management interface.

* * * * *